United States Patent [19]

Mathews

[11] 3,759,380

[45] Sept. 18, 1973

[54] GRAIN SEPARATING MECHANISM FOR COMBINES OR THE LIKE

[76] Inventor: Bernard C. Mathews, P.O. Box 70, Crystal Lake, Ill. 60014

[22] Filed: Apr. 9, 1971

[21] Appl. No.: 132,727

Related U.S. Application Data

[63] Continuation-in-part of Ser. No. 818,295, April 22, 1969, Pat. No. 3,606,026.

[30] Foreign Application Priority Data

Apr. 15, 1970  Canada .................................. 80207

[52] U.S. Cl. ..................... 209/22, 209/27, 209/318, 209/326
[51] Int. Cl. ............................................. B07b 9/00
[58] Field of Search ............................... 130/24, 25; 209/24–27, 312, 315, 318, 396, 397, 398, 326, 22, 23, 28; 415/148

[56] References Cited

UNITED STATES PATENTS

| | | | |
|---|---|---|---|
| 2,587,289 | 2/1952 | Cook ............................. | 209/326 X |
| 2,767,905 | 10/1956 | Creed ............................ | 415/148 X |
| 2,351,567 | 6/1944 | Welty ............................. | 130/24 |
| 299,211 | 5/1884 | Earhart ........................... | 209/326 |
| 530,090 | 12/1894 | Conner .......................... | 209/318 |
| 2,456,248 | 12/1948 | Berry ............................ | 209/366 X |
| 2,713,942 | 7/1955 | Von Rechenberg ............ | 209/318 X |

Primary Examiner—Frank W. Lutter
Assistant Examiner—William Cuchlinski, Jr.
Attorney—Zabel, Baker, York & Jones

[57] ABSTRACT

The separating mechanism comprises an upper sieve and a lower sieve located one above the other and supported by cranks journaled in the side walls of the casing of a combine. The cranks for the upper and lower sieves are offset from each other 180°. The cranks are driven at speed which is substantially synchronous with the gravitational movement of the threshing mix as it is being tossed. A fan located in front of the two sieves causes an air blast to blow upwardly through the upper sieve. Threshing mix deposited on the upper sieve will be tossed by the circular vibratory motion and the air blast separates the chaff from the grains during the tossing action and the grains drop through the upper sieve. A shutter regulates the air blast. Several sieve types are shown, two of which have transverse ribs.

10 Claims, 10 Drawing Figures

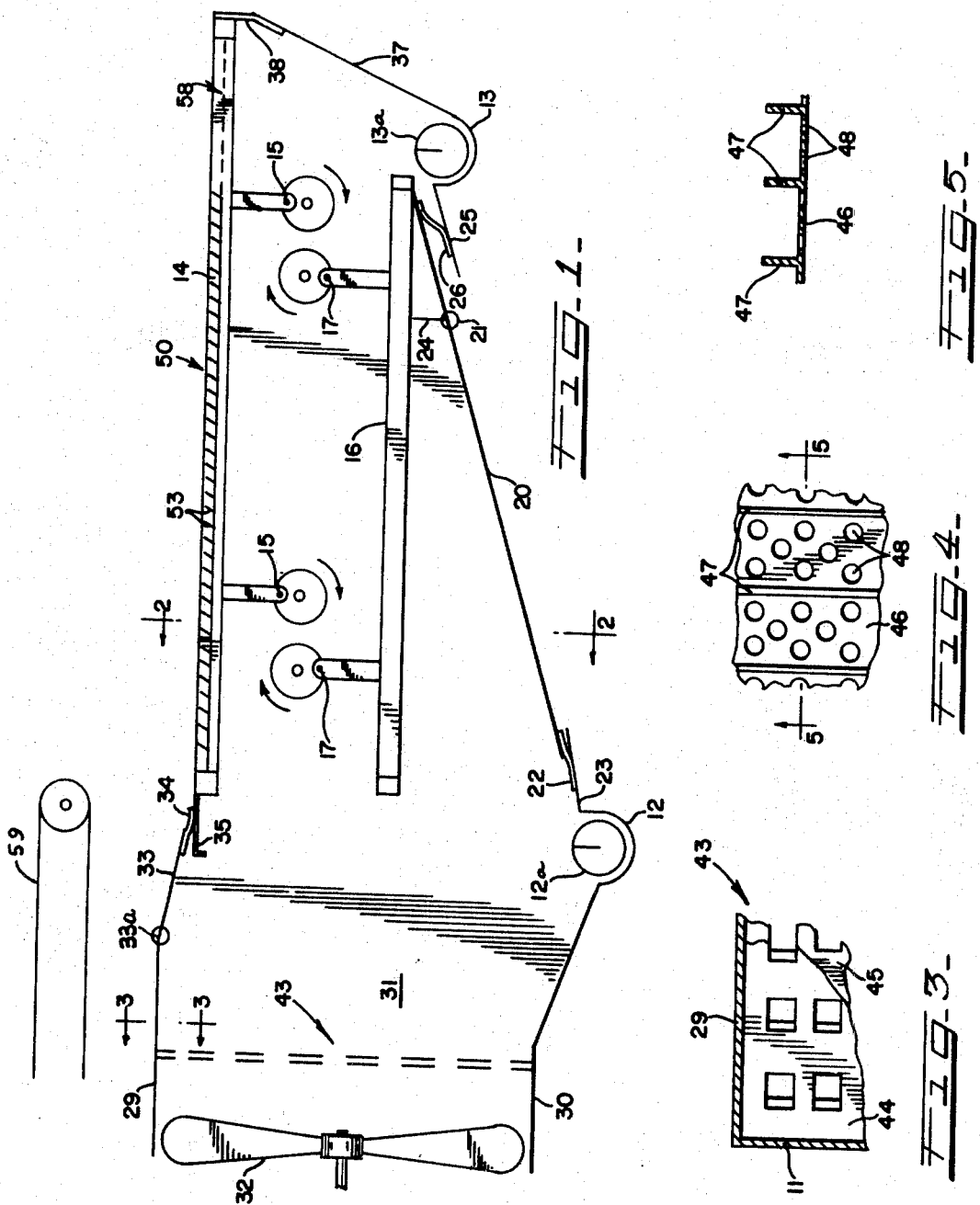

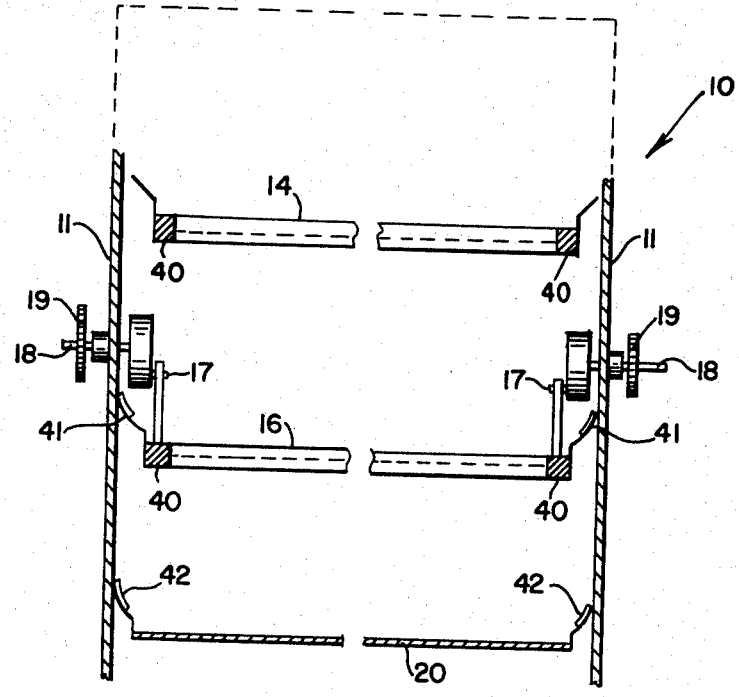
FIG-2-
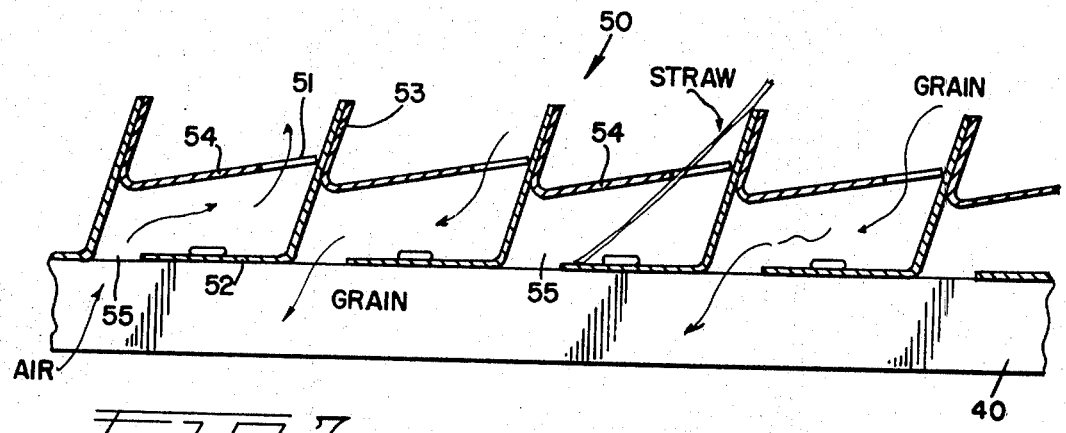
FIG-7-
INVENTOR
BERNARD C. MATHEWS

PATENTED SEP 18 1973
3,759,380
SHEET 3 OF 3
FIG. 8.
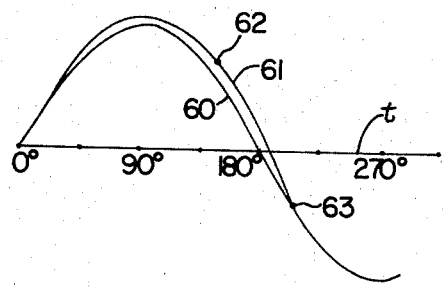
FIG. 10.
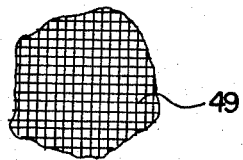
FIG. 9.
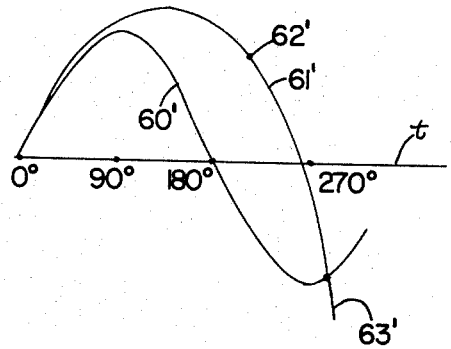
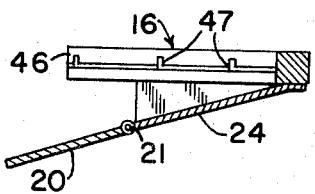
FIG. 6.
INVENTOR
BERNARD C. MATHEWS

GRAIN SEPARATING MECHANISM FOR COMBINES OR THE LIKE

This application is a continuation-in-part of my copending application Ser. No. 818,295 filed Apr. 22, 1969 now U.S. Pat. No. 3,606,026, granted Sept. 20, 1971.

The present invention relates to a new and improved grain separating mechanism for combines or the like.

In combines now used, grain is separated from the straw, chaff and other particles of the threshing mix by a combination of screening and air blast action, and the screen is reciprocated back and forth to walk the larger particles off of the rear edge of the screen from which they drop to the ground.

One problem encountered with the standard sieve arrangement is that of grain loss. The air blast not only drives off the straw and chaff, but also removes some of the grain. The grain loss increases very rapidly as the input from the conveyor increases; with heavy loads, the grain loss can represent a serious economic loss. There also can be a certain amount of walking loss, in which the grain walks off of the rear edge of the screen along with straw and other larger particles which are not airborne.

According to my invention, I have found that if I vibrate the sieve with an orbiting motion, that is in a circular path instead of the linear reciprocating path of the standard sieve arrangement, and at a certain frequency which, in general, is much less than the frequency now imparted to reciprocating sieves, that the grain loss is very substantially reduced.

More specifically, the sieve is supported by cranks, and the linear speed of the cranks is such that the vertical component of the sieve motion for a portion of the crank cycle is substantially synchronous with the gravitational movement of the particles overlying the orbiting sieve.

Improved separating action is also obtained if the aggressive characteristic of the upper sieve is provided by transverse ribs.

The present invention enables the sieve to handle much heavier loads at a lower air blast delivery rate than the standard arrangement, and at the same time to reduce the grain loss very substantially and to reduce the amount of chaff in the separated grain.

Other objects, features and advantages of my invention will become apparent as the description proceeds.

In the drawings:

FIG. 1 is a diagrammatic elevation of a preferred embodiment of my invention as applied to a combine;

FIG. 2 is a fragmentary transverse section taken along the line 2—2 of FIG. 1;

FIG. 3 is a fragmentary elevation of the shutter device, taken along the line 3—3 of FIG. 1;

FIG. 4 is a fragmentary elevation showing a preferred sieve construction;

FIG. 5 is a vertical section taken along the line 5—5 of FIG. 4;

FIG. 6 is a detailed vertical horizontal section through the rear end of the lower sieve;

FIG. 7 is a vertical section similar to FIG. 5 showing a modified sieve construction;

FIGS. 8 and 9 are graphs illustrating the operation of the mechanism; and

FIG. 10 is a fragmentary elevation showing still another sieve construction.

FIGS. 1 and 2 show an upper sieve 14 and a lower sieve 16 which are horizontally disposed within a combine casing 10 (FIG. 2), which is of conventional construction having side walls 11. FIG. 1 shows a front auger trough 12 and a rear auger trough 13 which extend transversely of the lower part of the casing.

The upper sieve 14 is supported by four cranks 15, two on each side. The lower sieve 16 is supported by four cranks 17. Each of the cranks 15 and 17 are mounted on a stub shaft 18 journaled, by suitable bearings, in the side walls 11 as shown in FIG. 2. Sprockets 19 are mounted at the outer ends of the stub shafts 18, and all are of uniform diameter so that they may be driven at a uniform speed in a vertical longitudinal plane and as indicated by the arrows in FIG. 1 in the same rearwardly direction by a single sprocket chain for each side, not shown. The FIG. 1 position of the crank 15 is referred to herein as the 90° position, and of the crank 17, as the 270° position.

The casing has a movable bottom wall 20 which is supported at its rear end from the lower sieve 16 by a hinge 21. The front end of the bottom wall terminates in a rubber wear plate 22 which bears on a lip 23 of the front auger trough 12. Thus as the rear end of the bottom wall 20 moves in a circular path, the wear plate 22 will slide back and forth on the lip 23.

Underneath the rear end of the lower sieve 16 there is a short tray 24 the front end of which carries the hinge 21. Underneath the tray 24 is a lip portion 25 of the rear auger trough. A seal 26 is provided between the tray 24 and the lip 25 by means of a resilient strip of metal or relatively stiff rubber which is secured to the underside of the tray 24 and bears against the lip 25.

At the front end of the casing 10 there are two horizontal walls 29 and 30 which cooperate with the side walls 11 to define a plenum 31. One or more axial delivery fans 32 are mounted side by side in front of the plenum and driven by suitable belts or chains, not shown. The space between the front edge of the upper wall 29 and the upper sieve 14 is sealed by a hinged flap 33 having a rubber wear plate 34 which bears against a lip 35 extending forwardly from the upper sieve 14. The flap 33 is connected to upper wall 29 by a hinge 33a.

The casing 10 includes a lower rear wall 37 which extends upwardly and rearwardly from the rear auger trough 13. A hinged strip of metal or a flexible strip of relatively stiff rubber 38 extends downwardly from the rear edge of the upper sieve 14 and bears against the front upper surface of the rear wall 37. Thus the hinged flap 33 and the flexible strip 38 provide flexible seals which prevent the escape of air so that substantially all of the air in the plenum 31 will pass upwardly through the upper sieve 14, some of it also passing through the lower sieve 16.

As shown in FIG. 2, flexible seals 41 mounted on the side rails 40 of the lower sieve 16 engage the side walls 11 to prevent loss of grain at this point. A similar seal 42 is provided for the bottom wall 20, but is not necessary for the upper sieve 14 if the clearance is small.

Means are provided for regulating the volume and force of the air blast, which means can be a variable speed drive for the fans 32, or a shutter device 43, as shown. A more or less diffuse air stream is desired which will extend through the whole cross section of the plenum 31. This assures that a substantial portion of the air current will move directly into the space between the sieves 14 and 16 to drive away the chaff and any particles which fall through the upper sieve due to the fact that they are entrapped by the grain. As a result, by the time that the grain drops onto the lower sieve 16, it is quite clean. A portion of the air current goes into the space between the lower sieve 16 and the bottom wall 20, and thence upwardly through the lower sieve 16.

The shutter 43 comprises two superimposed barriers 44 and 45, respectively, shown in FIG. 3, each of which is provided with a number of overlapping square openings. The barriers are shiftable with respect to each other so that the size of the opening may be regulated.

The sieves 14 and 16 may be of the wire mesh type 49 shown in FIG. 10, or of perforated metal type with or without ribs, as hereinafter described.

The threshing mix is deposited on the upper sieve 14 at its front end by a suitable conveyor 59. The separation takes place primarily at the upper sieve 14. The speed of the orbiting movement is such that the threshing mix is tossed or tends to be tossed above the sieve surface during the upper half of each cycle.

The object is to impart a velocity to the mix such that the vertical movement of the particles during the upper or walking part of the crank revolution roughly approximates the vertical motion of the sieve. Thus, the particles are more or less weightless with respect to the sieve surface, being either suspended in air at a slight distance above the surface of the sieve, or else resting on that surface with very little weight. Any force which is exerted on the particles by the air blast will be effective in imparting an upward movement of chaff and other particles having a high ratio of surface area to mass, whereas the grains or kernels will not be as greatly affected, with the result that there will be a differential movement, or sifting in which the chaff and straw is blown away from the sieve, and the kernels remain close to the sieve surface. During the lower half of the crank revolution they press against the sieve surface and there is relative horizontal movement between the two so that the kernels work their way through the openings in the sieve.

The cranks 15 and 17 are rotated so that they move rearwardly during the upper half of the cycle, as indicated by the arrows in FIG. 1. Thus at the time the mix is tossed, it will have a rearwardly horizontal component of motion, causing the mix to walk toward the rear of the sieve. The walking is necessary in order to distribute the mix across the length of the sieve, avoiding pile up beneath the conveyor 59.

In the construction shown, the cranks 15 have a radius of 1 inch (2-inch throw). Best results are obtained at speeds between 190 and 230 RPM, with maximum results at 207 PRM. It has been observed that below this speed range, the threshing mix does not walk to the rear; at speeds above this range the grains dance up and down, but do not tend to drop through the perforations of a sheet metal sieve except on a random basis. Also at the higher speeds, the mix remains more or less in suspension, and grain separation from the mix is greatly reduced.

At optimum speed, the speed of the cranks is such that the vertical component of the crank motion is substantially synchronous during the upper half of the crank cycle with the gravitational movement of the particles overlying the orbiting sieve. This action is illustrated in the graph of FIG. 8, in which the curve 60 represents the vertical component with respect to time $t$ of the screen motion, this component being a harmonic motion as evidenced by the sine curve 60. The curve 61 represents the vertical component with respect to time of the tossing motion imparted to a particle 62 resting on a sieve wherein the crank radius is one inch and the frequency is 210 RPM, which are the values indicated by the curve 60, and assuming no air blast.

Although the maximum velocity of the vertical component of the tossing motion occurs at the zero degree position of the cranks and sieve (compare FIG. 1 in which the cranks 15 are shown at the 90° position) the tossing motion is not apparent until the sieve arrives at about the 20° to 30° position. From there on the curves 60 and 61 are separated, but the vertical component 61 approximates rather closely the curve 60 down to the point 63 of intersection, somewhere in the 180° to 225° range.

Thus, FIG. 8 illustrates the weightless portion of the cycle at the optimum speed during which the differential action of the air blast is most effective, this being from approximately the 20° to 30° point to the 225° point.

At substantially higher speeds, as shown in FIG. 9, it will be noted that the width of the sine curve 60' is diminished, representing a shifting to the left of the 180° position. At the same time, the greater velocity tends to toss the grains higher, so that the curve 61' is shifted up and to the right. Here the point of intersection 63' will be at or beyond the 270° point, which means that the grain hits the sieve surface at a time when the sieve is commencing its upward motion. This causes the grains to bounce or dance, with the result that the pseudo-resonant relationship is destroyed.

If the cranks are rotated at a much slower speed, then the 180° position will be shifted to the right, and the curve 61 will be shifted to the left, which means that the particles are in contact with the sieve for the full cycle. Therefore the differential or selective action of the same air blast will not be as effective, and separation reduced. For comparable bed conditions, such as thickness of threshing mix, the walking of the threshing mix will also be retarded.

In achieving the desired result, the relationship between crank speed in revolutions per second and radius R in inches appears to be RPS $\cdot \sqrt{R} = K$, where $K$ is a numerical coefficient having a value of between 3 and 4.5.

The observed optimum RPS in the above example, 3.45 corresponding to 207 RPM, when substituted in the above formula gives a $K$ value of 3.45. Experiments with cranks having a radius of 1½ inches gave speeds of 171 and 189 depending on the crop, representing a $K$ value of 3.5 for corn and 3.83 for soy beans.

If the tossing started at the 0° point in FIG. 8, the $K$ value would theoretically be 4.36, but apparently the gravitational movement of the mix is somewhat less extensive than theoretical in the 0° to 90° sector. Since the 190 and 230 RPM limits of the first mentioned example represent $K$ values of from 3.15 to 3.85, it appears that there is a range of $K$ values, somewhat below the theoretical value of 4.36, which depends on various factors not yet fully ascertained.

However, variations in the optimum speed within this range of $K$ values are believed to be due bed conditions. The threshing mix, being loosely consolidated, lies on the sieve in a bed of substantial thickness. If this bed is somewhat resilient, so that the vertical motion of the upper part is substantially less than that of the lower portion, the optimum speed for thicker beds of certain crops will be different than that for other crops, with the result that the $K$ values derived therefrom will differ from one another.

The upper sieve 14 is made in two sections, a front section 50 about 4 to 5 feet long from front to back, and a rear section 58 which is about 15 inches long. Both sections may be either of a wire mesh type 49 (FIG. 10) or a perforated metal type, but the openings in the rear section 58 should be large enough, such as from three-quarter inch to 1- inch, to accommodate grain heads and other insufficiently threshed particles so that they will drop through to the tailings auger 13a for return to the threashing cylinder.

The upper surface of the front section 50 of upper sieve 14 has rearwardly facing transverse portions longitudinally spaced from each other to impart a rearward horizontal component to the tossing action. This characteristic of the sieve surface which promotes walking is termed "aggressiveness." The transverse wires of the wire mesh screen 49 constitute the rearwardly facing transverse portions which impart to the surface of the sieve the desired aggressiveness.

However, a ribbed construction is preferred for the front section 50 so as to accommodate a thicker bed of threshing mix. As shown in FIGS. 4 and 5, transverse ribs 47 are applied to a perforated metal type sieve 46 having circular openings 48. The ribs 47 provide the rearwardly facing transverse portions, and are of a height which tends to prevent the walking of already separated grain which, as previously pointed out, is not affected by the air blast as much as the lighter particles when in the weightless condition.

A modified sieve construction is shown in FIG. 7 having transverse ribs 53 providing a series of channels. The openings are in the form of slots 51 located at the rear part of the channel bottoms 54. The large slot like openings 51 permit more rapid withdrawal of the grain from the channel after separation and facilitate flow of the grain counter to the blast. A labyrinthine path is provided by a shelf 52 which underlies the opening 51 in the channel bottom and provides a second opening 55 which is offset forwardly of the opening 51. This tends to prevent endwise passage of straw particles through the sieve. This construction is more fully described in the aforesaid copending application to which reference is hereby made.

The lower half of the orbiting cycle causes relative horizontal movement between the grains and the sieve which causes the grains to work their way through the openings with a certain amount of pressure.

The lower sieve 16 may be either of the wire mesh type 49 or of the perforated sheet metal type 46 either ribbed or not, but the openings are somewhat smaller than in the case of the upper sieve 14. For example, the openings 48 are about three-eighths inches in diameter for wheat, barley and rice, and correspondingly larger or smaller for larger or smaller grains.

As shown in FIG. 1, even though all of the cranks 15 and 17 are rotated in the same rotative direction, the lower cranks 17 are 180° offset from the upper cranks 15. Thus, the sieves 14 and 16 move in opposite vertical directions at the same time. This provides a counter-balancing action which eliminates the usual vibration of the housing encountered in linear vibratory sieves.

Because the lower sieve 16 performs a cleaning function on a comparatively thin bed of previously separated grain, the objective is to walk the comparatively small proportion of larger particles to the rear of the sieve for delivery to the tailings auger 13a. Therefore, a lesser tossing action is desired. This is achieved by using less than the full force of the air blast and by driving the sieve at less than the gravity synchronous speed described for the upper sieve 14. In the construction shown, the crank radius for the lower sieve 16 is three-quarter inches.

The disclosure of my aforesaid copending application, Ser. No. 818,295 now U.S. Pat. No. 3,606,026, is hereby incorporated by reference into this application insofar as said disclosure is consistent with the teachings of this application.

Although only preferred embodiments of my invention have been shown and illustrated herein, it will be understood that various modifications and changes can be made in the construction shown without departing from the spirit of my invention as pointed out in the appended claims.

I claim:

1. Separating mechanism for grain comprising a sieve for receiving a threshing mix, including straw, for movement longitudinally of said sieve toward the rear thereof, non-resilient supporting means located at front and back portions of said sieve mounting same for vibratory movement in an orbital longitudinal and vertical path, means for driving said sieve in said orbital path at a speed not substantially greater than that speed of which the vertical component of said sieve motion is substantially synchronous with the vertical component of the gravitational movement of the threshing mix overlying said sieve for the upper portion of the sieve cycle, and means for establishing an air blast which passes longitudinally upwardly through said sieve to effect separation of the grain from the threshing mix overlying said sieve, said sieve having transverse ribs and bottom portions defining a series of transverse channels, the openings of said sieve being located in said channel bottom portions.

2. Grain separating mechanism as claimed in claim 1 which includes a second sieve located beneath said first sieve, means for vibrating said second sieve in an orbital path in the same rotative direction as said first sieve but 180° out of phase therewith, at least a portion of said air blast passing upwardly through said second sieve.

3. Grain separating mechanism as claimed in claim 2 which includes means for regulating the volume and force of said air blast, and an enclosure surrounding said sieves and communicating with said air blast establishing means.

4. Grain separating mechanism as claimed in claim 2 in which the radius of the orbital path of said second sieve is less than the radius of the orbital path of said first sieve, and in which both sieves are vibrated at the same number of revolutions per minute.

5. Grain separating means as claimed in claim 1 in which said speed is within the range of from 190 to 230 RPM, and in which the radius of said orbital path is substantially 1 inch.

6. Separating mechanism for grain comprising a sieve for receiving a threshing mix, including straw, for movement longitudinally of said sieve toward the rear thereof, non-resilient supporting means located at front and back portions of said sieve mounting same for vibratory movement in an orbital longitudinal and vertical path, means for driving said sieve in said orbital path at a speed substantially equal to $\sqrt{K/R}$ revolutions per second where $R$ is the radius of said orbital path in inches and $K$ is a coefficient having a value of from 3.0 to 4.5, and means for establishing an air blast which passes longitudinally upwardly through said sieve to effect separation of the grain from the threshing mix overlying said sieve, said sieve having transverse ribs and bottom portions defining a series of transverse channels, the openings of said sieve being located in said channel bottom portions.

7. Separating mechanism for grain comprising a sieve for receiving a threshing mix, including straw, for movement longitudinally of said sieve toward the rear thereof, non-resilient supporting means located at front and back portions of said sieve mounting same for vibratory movement in an orbital longitudinal and vertical path, means for driving said sieve in said orbital path at a speed not substantially greater than $\sqrt{3.85/R}$ revolutions per second where $R$ is the radius of said orbital path in inches, and means for establishing an air blast which passes longitudinally upwardly through said sieve to effect separation of the grain from the threshing mix overlying said sieve, said sieve having transverse ribs and bottom portions defining a series of transverse channels, the openings of said sieve being located in said channel bottom portions.

8. Separating mechanism for grain comprising a sieve for receiving a threshing mix, including straw, for movement longitudinally of said sieve toward the rear thereof, non-resilient supporting means located at front and back portions of said sieve mounting same for vibratory movement in an orbital longitudinal and vertical path, means for driving said sieve in said orbital path at a speed such that the vertical component of said sieve motion is substantially synchronous with the vertical component of the gravitational movement of the threshing mix overlying said sieve for the upper portion of the sieve cycle, and means for establishing an air blast which passes longitudinally upwardly through said sieve to effect separation of the grain from the threshing mix overlying said sieve, said sieve having transverse ribs and bottom portions defining a series of transverse channels, the openings of said sieve being located in said channel bottom portions.

9. Grain separating mechanism as claimed in claim 8 which includes means for regulating the volume and force of said air blast.

10. Grain separating mechanism as claimed in claim 8 in which said mounting means comprise a crank at each corner of said sieve.

* * * * *

UNITED STATES PATENT OFFICE
CERTIFICATE OF CORRECTION

Patent No. 3,759,380　　　　　　　　Dated September 18, 1973

Inventor(s) Bernard C. Mathews

It is certified that error appears in the above-identified patent and that said Letters Patent are hereby corrected as shown below:

Column 7, line 6, the expression "$\sqrt{K/R}$" has been changed to "$\dfrac{K}{\sqrt{R}}$".

Column 7, line 23, "$\sqrt{3.85/R}$" has been changed to "$\dfrac{3.85}{\sqrt{R}}$".

Signed and sealed this 1st day of January 1974.

(SEAL)
Attest:

EDWARD M.FLETCHER,JR.　　　　　　RENE D. TEGTMEYER
Attesting Officer　　　　　　　　　　Acting Commissioner of Patents